United States Patent [19]
Griffin et al.

[11] Patent Number: 6,129,570
[45] Date of Patent: Oct. 10, 2000

[54] CARD RECEPTACLE ASSEMBLY

[75] Inventors: Patrick Griffin, Limerick; Mike Keane, Galway, both of Ireland

[73] Assignee: Molex Incorporated, Lisle, Ill.

[21] Appl. No.: 09/206,915

[22] Filed: Dec. 7, 1998

[30] Foreign Application Priority Data

Jan. 9, 1998 [EP] European Pat. Off. ............ 98 100 303

[51] Int. Cl.[7] .................................................. H01R 13/15
[52] U.S. Cl. .......................................... 439/260; 439/188
[58] Field of Search .................................... 439/260, 267, 439/188; 235/441

[56] References Cited

U.S. PATENT DOCUMENTS

| | | | |
|---|---|---|---|
| 4,735,578 | 4/1988 | Reichardt et al. | 439/152 |
| 4,752,234 | 6/1988 | Reichardt et al. | 439/260 |
| 4,859,199 | 8/1989 | Komatsu | 439/267 |
| 4,976,630 | 12/1990 | Schuder et al. | 439/260 |
| 5,395,259 | 3/1995 | Casses | 439/188 |
| 5,655,917 | 8/1997 | Kaneshige et al. | 439/155 |
| 5,668,365 | 9/1997 | Ito et al. | 235/486 |
| 5,674,080 | 10/1997 | Takemura | 439/159 |
| 5,898,159 | 4/1999 | Huang | 235/441 |
| 5,936,222 | 8/1999 | Korsunsky et al. | 235/441 |
| 5,997,356 | 12/1999 | Chang | 439/630 |

FOREIGN PATENT DOCUMENTS

| | | |
|---|---|---|
| 468828 | of 0000 | European Pat. Off. . |
| WO9805069 | of 0000 | WIPO . |

*Primary Examiner*—Khiem Nguyen
*Assistant Examiner*—Son V. Nguyen
*Attorney, Agent, or Firm*—A. A. Tirva; Stacey E. Caldwell

[57] ABSTRACT

A card reader is provided for a chip card having card contacts. The card reader includes a housing having a card receiving mouth and a plurality of receptacle contacts having resilient contact portions for engaging the card contacts after the card is inserted through the mouth to a fully inserted position. An actuator is movably mounted on the housing for movement between an inoperative position and an actuating position. In the inoperative position, the actuator allows the card to be inserted past the contact portions toward its fully inserted position with substantially zero force on the contact portions. In the actuating position, the actuator biases the card contacts into engagement with the contact portions of the receptacle contacts. The actuator includes a biasing portion for biasing the card and the card contacts against the contact portions of the receptacle contacts. The actuator includes an actuating portion engageable by the card when at its fully inserted position to move the actuator from its inoperative position to its actuating position.

2 Claims, 3 Drawing Sheets

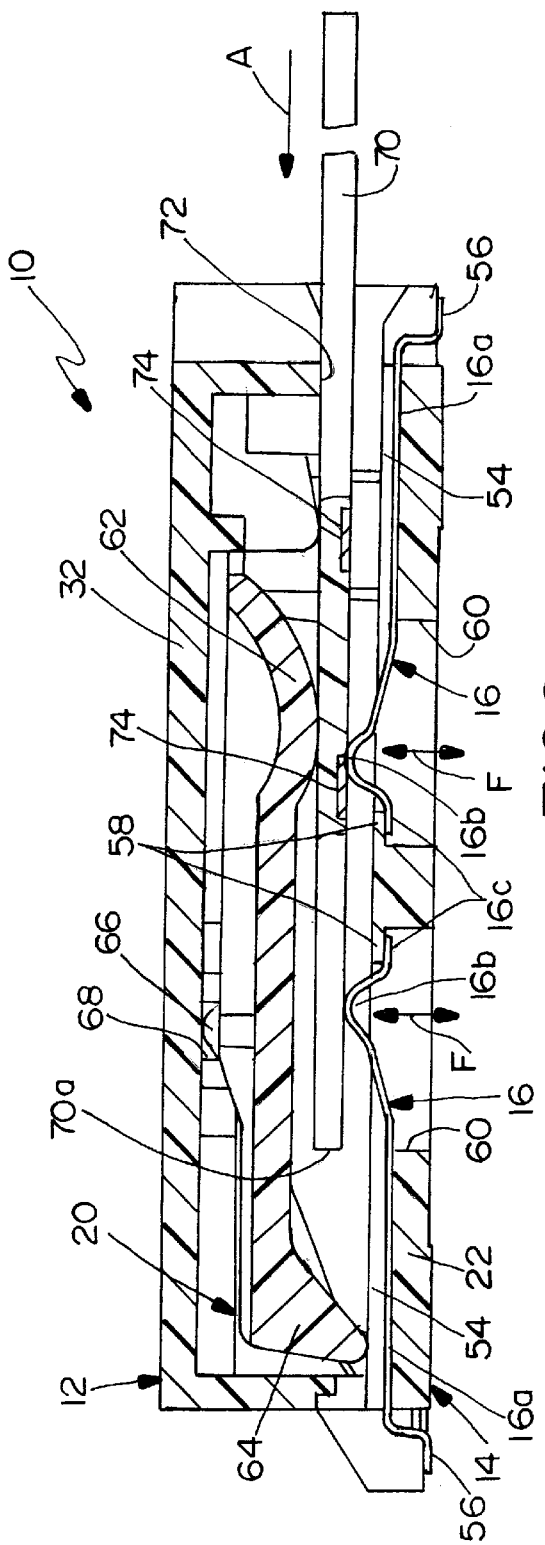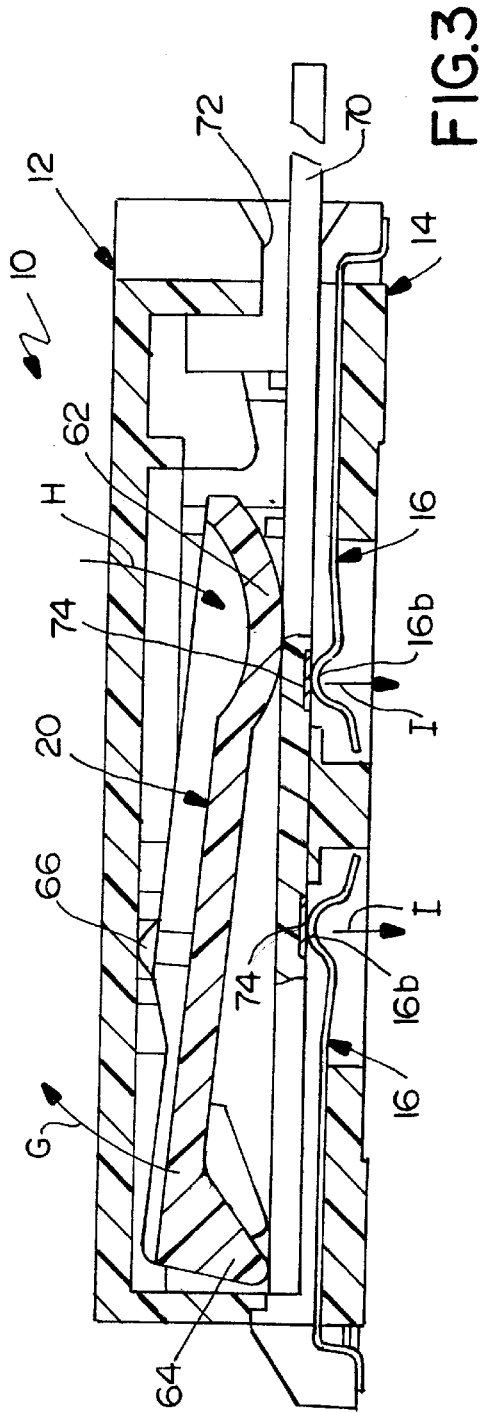

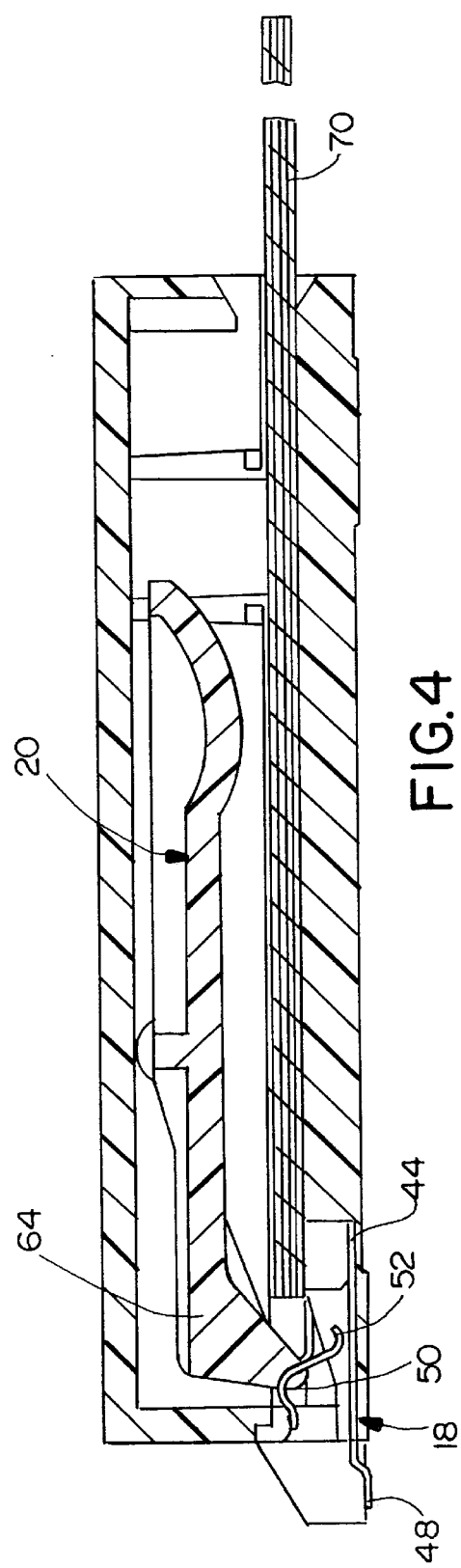
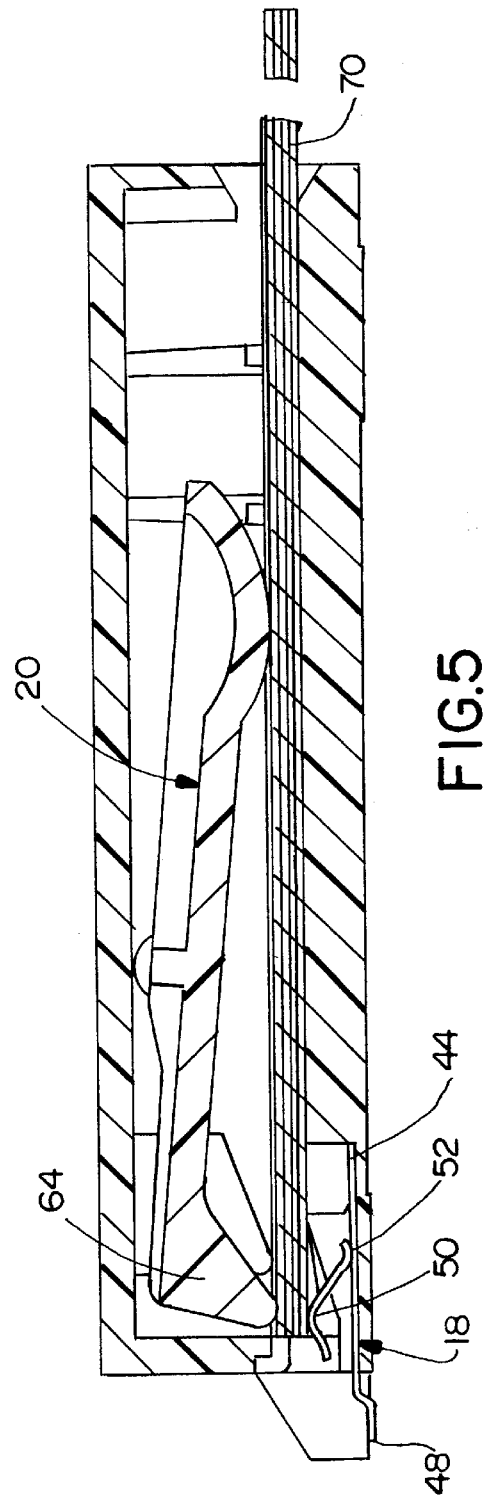

CARD RECEPTACLE ASSEMBLY

FIELD OF THE INVENTION

This invention generally relates to a receptacle assembly, such as a card reader or SIM connector, for a chip card.

BACKGROUND OF THE INVENTION

Chip cards presently are used in a variety of applications and comprise a card of approximately the same size as a standard credit card. The card, itself, contains intelligence in the form of a memory circuit. A card reader is used to detect certain information stored on the card.

One such chip card is identified as a "Subscriber's Identification Module" or "SIM" which is a miniature chip card for use in small hand held devices such as pocket size cellular telephones. The SIM provides user identification in individual telephone handsets and the SIM card reader readily accommodates insertion and removal of the SIM to provide quick identification and easy access by a cellular telephone user.

Other applications of chip cards are in instantaneous bank teller facilities, cable television decoders or descramblers, pay TV machines, pay telephones, health cards and a variety of other uses.

A typical SIM or other chip card has exposed contact pads for matingly engaging underlying cantilevered contacts of a SIM connector or card reader. The card is inserted and removed manually, thereby exposing the underlying contacts.

Because of the frequent use of a chip card and because the same card can be used in a variety of applications, the number of mating cycles required of a card and, therefore, the card reader connector is ever increasing. Known chip card readers utilize friction-style contacts whereby the card contacts frictionally engage corresponding contacts on the card reader. However, because of repeated insertion and withdrawal of the card, problems are encountered because the contacts on both the card and the reader become worn and their performance quality eventually is unfavorably affected. Therefore, some card readers have incorporated mechanisms whereby the insertion and withdrawal of a card from the reader does not continually wear on the contacts. Instead, the card contacts engage the reader contacts only after the card is inserted. One such mechanism, called a "landed-style terminal mechanism" has greatly increased the number of cycles of card readers by moving the reader contacts into engagement with the card contacts only after the card is fully inserted. However, these types of mechanisms can be complicated and expensive and, therefore, are not always desirable.

There is a need for a simple card reader receptacle or connector that achieves the increased cycle requirements of new card reader applications but which is neither expensive nor complicated. The present invention is directed to satisfying this need and solving the problems discussed above.

SUMMARY OF THE INVENTION

An object, therefore, of the invention is to provide a new and improved receptacle for a chip card, such as in a card reader or connector of the character described.

In the exemplary embodiment of the invention, the receptacle includes a housing having a card-receiving mouth. A plurality of receptacle contacts are fixed against movement on the housing and have resilient contact portions for engaging the card contacts after the card is inserted through the mouth to a fully inserted position. An actuator is movably mounted on the housing for movement between an inoperative position allowing the card to be inserted past the contact portions toward its fully inserted position with substantially zero force on the contact portions, and an actuating position biasing the card and, thereby, the card contacts into engagement with the contact portions of the receptacle contacts. The actuator includes a biasing portion for engaging the card and biasing the card contacts against the contact portions of the receptacle contacts, and an actuating portion is engageable with the card when at its fully inserted position to move the actuator from its inoperative position to its actuating position.

As disclosed herein, the receptacle contacts are cantilevered on the housing, with fixed ends anchored to the housing and flexible ends defining the resilient contact portions of the receptacle contacts. Pivot means mount the actuator on the housing intermediate the biasing portion and the actuating portion of the actuator, whereby the actuator teeters about the pivot means.

In essence, the receptacle and housing are configured to define a card-insertion path from the card-receiving mouth, past the biasing portion of the actuator, past the contact portions of the receptacle contacts and to the actuating portion of the actuator. When traveling in this path, a leading edge of the chip card engages the actuator portion at the end of the path to move the actuator from its inoperative position to its actuating position.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is a section through the card reader in assembled condition, with the actuator in its inoperative position;

FIG. 3 is a view similar to that of FIG. 2, with the actuator having been moved to its biasing position by the inserted chip card;

FIG. 4 is a section through the card reader in assembled condition, similar to FIG. 2, with the actuator and the switch in their inoperative positions; and FIG. 5 is a view similar to that of FIG. 3 with the actuator and switch moved to their biasing positions, showing how the actuator forces the card down to activate the switch.

DETAILED DESCRIPTION OF THE PREFERRED EMBODIMENT

Figure 1:
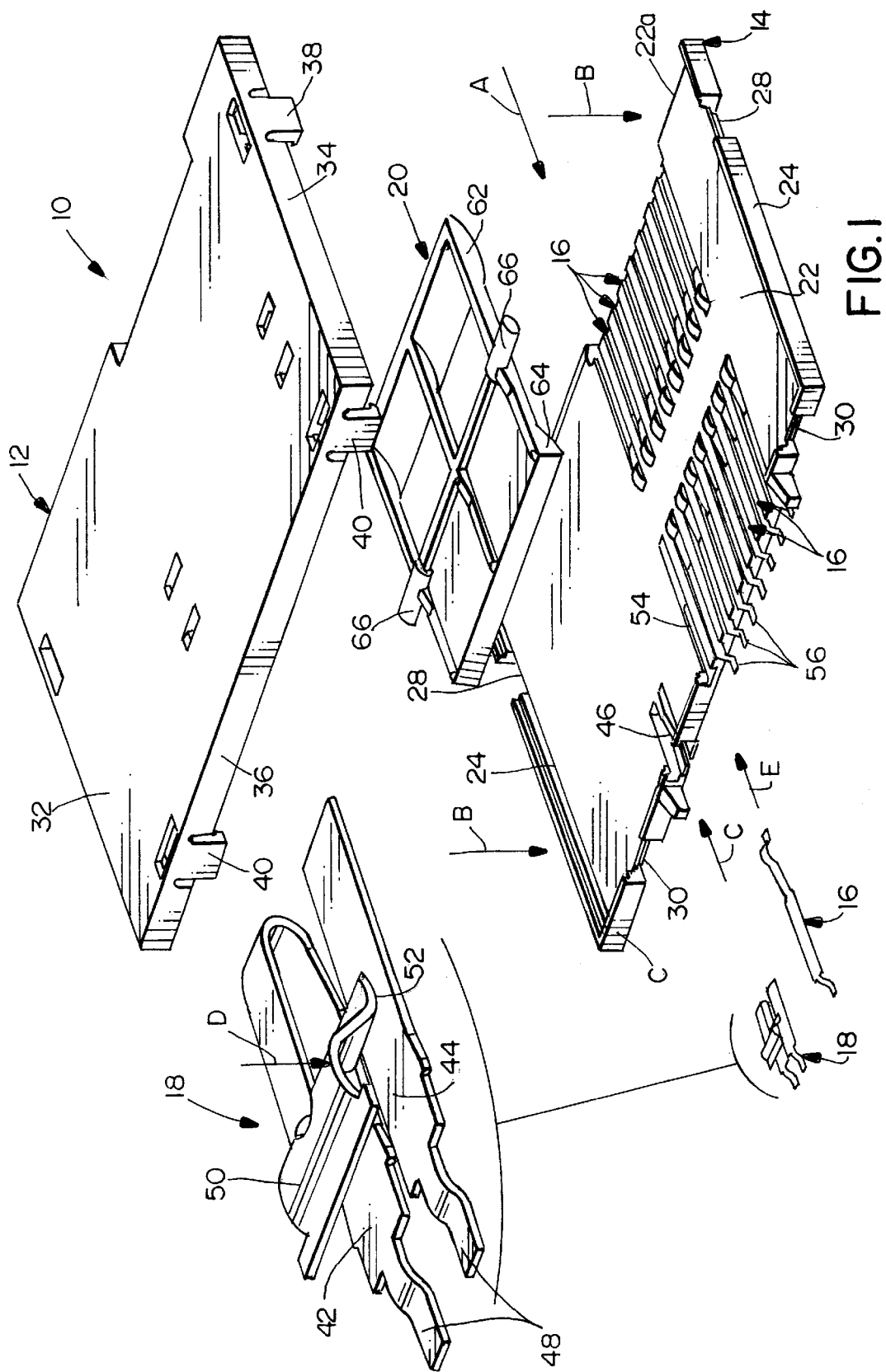
FIG. 1 is an exploded perspective view of a card reader incorporating the concepts of the invention.

Referring to the drawings in greater detail, and first to FIG. 1, the concepts of the invention are incorporated in a receptacle, generally designated 10, which is shown in the form of a chip card reader or SIM connector. The receptacle includes a two-part housing defined by a top part or cover, generally designated 12, and a bottom part or base, generally designated 14. A plurality of receptacle or reader contacts, generally designated 16, are mounted on base 14. An end of position switch assembly, generally designated 18, also is mounted on base 14. An actuator, generally designated 20, is sandwiched between cover 12 and base 14 and is pivotally movable between inoperative and actuating positions, as described hereinafter.

More particularly, bottom part or base 14 of the reader housing includes a bottom wall 22, opposite upstanding side walls 24 and an upstanding rear wall 26. Each side wall 24 has a latch notch 28 and rear wall 26 has a pair of latch notches 30. The front edge 22a of bottom wall 22 is not provided with an upstanding wall to facilitate forming a mouth for the insertion of a chip card in the direction of arrow "A" as described hereinafter.

Top part or cover 12 of the two-part housing includes a top wall 32, opposite depending side walls 34 and a depending rear wall 36. A hooked latch 38 projects downwardly from each side wall 34 for insertion into latch notches 28 in the side walls of the base, and a pair of hooked latches 40 project downwardly from rear wall 36 for insertion into latch notches 30 of the base.

To assemble cover 12 to base 14 and sandwich actuator 20 therebetween, the cover is moved downwardly in the direction of arrows "B", aligning hook latches 38 and 40 with latch notches 28 and 30, respectively. The distal ends of the hooked latches are chamfered so that they are biased outwardly by the edges of bottom wall 22 of the base. Once the hooked distal ends of the cover pass the bottom wall of the base, the hooked latches will resiliently snap back inwardly to lock the two-part housing together. The cover and base can be heat staked for permanent attachment. Each of the cover and the base is a one-piece structure unitarily molded of dielectric material such as plastic or the like.

The end of position switch assembly 18 includes first and second contacts 42 and 44, respectively, inserted in the direction of arrow "C" into recessed areas 46 in bottom wall 22 of base 14. The switch contacts have tail portions 48 for surface connection, as by soldering, to appropriate switch circuit traces on a printed circuit board. First contact 42 has a raised portion 50, and a contact portion 52 extends laterally over the top of second contact 44. When a chip card is inserted into receptacle 10, the leading edge of the card engages raised portion 50 of first contact 42 and biases offset contact portion 52 downwardly in the direction of arrow "D" for engaging second contact 44. Engagement of the contacts will close a circuit to energize a detection mechanism or to activate the card reader.

Referring to FIG. 2 in conjunction with FIG. 1, receptacle contacts 16 are data contacts for the card reader and are stamped and formed of sheet metal material. The contacts are arranged in two rows and are seated within recessed areas 54 in bottom wall 22 of base 14. The contacts are inserted into recessed areas 54 in the direction of arrow "E" (FIG. 1). Each contact has a tail portion 56 for surface connection, as by soldering, to appropriate circuit traces on the printed circuit board. Tails 56 are coplanar and are coplanar with tails 48 of switch contacts 42 and 44.

As best seen in FIG. 2, reader contacts 16 are cantilevered on base 14, with fixed ends 16a anchored within recessed areas 54 of the base, and flexible ends 16b defining resilient contact portions of the reader contacts. It can be seen that the contact portions are bowed upwardly for engagement with the card contacts, as described hereinafter.

The reader contacts have distal ends 16c which engage under ledges 58 molded integrally with base 14 to limit the upward movement of contact portions 16b and to spring load the contact portions. Bottom wall 22 of the base has openings 60 to allow for resilient flexing of contact portions 16b in the direction of double-headed arrows "F".

Still referring to FIG. 2 in conjunction with FIG. 1, actuator 20 is generally flat and rectangular as seen best in FIG. 1 and substantially covers the area occupied by reader contacts 16 within the housing. The actuator has a forward, downwardly bowed biasing portion 62 and a rearward, downwardly projecting actuating portion 64. The biasing portion and the actuating portion extend completely across the width of the actuator to provide full engagement by an inserted chip card, as described hereinafter. Pivot means in the form of a pair of pivot trunnion 66 are provided on the actuator intermediate the forward biasing portion and the rearward actuating portion. Therefore, the actuator pivots about pivot trunnion 66 in a teetering fashion. As seen best in FIG. 2, the pivot trunnion are captured within sockets 68 in the underside of top wall 32 of cover 12 by a press-fit, but allowing for pivotal rotation therewithin. The actuator is a one-piece structure molded of dielectric material such as plastic or the like.

FIGS. 2 and 3 show a chip card 70 having been inserted through a mouth 72 between cover 12 and base 14, in the direction of arrow "A". The chip card has a plurality of card contacts or pads 74 on or in the bottom surface of the card in its proper orientation, for engaging contact portions 16b of reader contacts 16.

FIG. 2 shows actuator 20 in its inoperative position. In this position, the actuator allows chip card 70 to be inserted past contact portions 16b of reader contacts 16 toward its fully inserted position with substantially zero force on the contact portions. In other words, while the top of the chip card may be in engagement with biasing porno 62 of the actuator in the inoperative position of the actuator, the weight of the plastic actuator is so insignificant that the card is inserted with substantially zero insertion forces on the contact portions. This considerably reduces wear on the contact portions.

As chip card 70 moves further in its insertion direction "A" to its final, fully inserted position shown in FIG. 3, a leading edge 70a of the card engages actuating portion 64 of actuator 20 and pivots the actuator upwardly in the direction of arrow "G" about pivot trunnion 66. When the actuator is pivoted to its actuating position shown in FIG. 3, biasing portion 62 of the actuator is biased or forced downwardly in the direction of arrow "H" to drive chip card 70 and card contacts 74 into engagement with contact portions 16b of reader contacts 16. It can be seen in FIG. 3 that the contact portions of the reader contacts have been forced or flexed downwardly in the direction of arrows "I". This establishes a good positive contact engagement between reader contact portions 16b and card contacts 74.

When the chip card 70 is pulled back out of the reader opposite the insertion direction "A", the leading end of the card moves away from actuating portion 64 of actuator 20 and allows the actuator to pivot back from its actuating position (FIG. 3) to its inoperative position (FIG. 2), allowing reader contact portions 16b to flex back to their inoperative positions (FIG. 2) and to allow the card to be removed, again with substantially zero forces on the respective contacts.

FIGS. 4 and 5 show views similar to FIGS. 2 and 3 respectively but with modified cross sections to illustrate the relationship between the actuator 20 and the end of position switch assembly 18. FIG. 4 shows actuator 20 in its inoperative position whereby chip card 70 can be inserted and the end of position switch is unactuated. When a card is inserted, as shown in FIG. 5, the actuator forces the card down on the switch assembly, engaging raised portion 50 of first contact 42 to effect closure of the circuit. If the actuator did not bias the card against the switch contact, the switch contact would not be activated.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A receptacle for a chip card having card contacts, characterized by:

a housing having a cover and a base defining a card receiving path therebetween;

a plurality of receptacle contacts mounted directly in the base of the housing in two rows, with fixed ends of the contacts anchored to the base of the housing and flexible ends of the contacts defining two rows of resilient contact portions for engaging the card contacts when the card is inserted in said path to a fully inserted position;

an actuator pivotally mounted on the cover of the housing between the cover and the base and lying generally above the receptacle contacts for pivotal movement by the chip card between an inoperative position allowing the card to be inserted past the contact portions toward its fully inserted position with substantially zero force on the contact portions independent of separate biasing forces and an actuating position biasing the card and thereby the card contacts into engagement with the contact portions of the receptacle contacts, the actuator including an actuating portion at one end of the actuator located at the end of the card receiving path and engageable by the card when at its fully inserted position to cause movement of the actuator from its inoperative position to its actuating position and a biasing portion located at the other end of the actuator past the two rows of contact portions for engaging the card and biasing the card contacts against the contact portions of the receptacle contacts; and pivot means pivotally mounting the actuator on the housing for pivotal movement along an axis generally parallel to the rows of receptacle contacts between the inoperative position and the actuating position of the actuator.

2. The receptacle as set forth in claim 1, wherein the card receiving path is configured such that the receptacle contacts and the actuating portion and biasing portion of the actuator are the only elements that extend into the card receiving path of the housing.

* * * * *